United States Patent [19]

Chou

[11] Patent Number: 4,706,767

[45] Date of Patent: Nov. 17, 1987

[54] DUAL-RANGE ANALOG-TO-DIGITAL CONVERTOR

[75] Inventor: Jau-Yi Chou, Fremont, Calif.

[73] Assignee: f.m.e. Corporation, Hayward, Calif.

[21] Appl. No.: 935,660

[22] Filed: Nov. 26, 1986

[51] Int. Cl.⁴ ...................... G01G 19/52; G01G 23/14
[52] U.S. Cl. ........................................ 177/50; 177/164
[58] Field of Search .................................. 177/50, 164

[56] References Cited

U.S. PATENT DOCUMENTS 4,375,243  3/1983  Doll ................................ 177/164 X
4,597,458  7/1986  Knothe et al. ...................... 177/164

FOREIGN PATENT DOCUMENTS 2325654  11/1973  Fed. Rep. of Germany ...... 177/164

Primary Examiner—George H. Miller, Jr.
Attorney, Agent, or Firm—Townsend and Townsend

[57] ABSTRACT

Method and apparatus for the improved operation of an electronic computing scale provides significantly increased resolution in a first weight sub-range (0–12 pounds in the illustrative embodiment). A coarser resolution is provided in a second weight sub-range (11–100 pounds). The raw load cell voltage is communicated along first and second branches, and subjected to a different transformation in each branch to produce first and second transformed voltages. In the first branch, raw voltages corresponding to weights in the low sub-range are mapped onto a desired sub-range of voltages. In the second branch, raw voltages corresponding to weights in the high sub-range are mapped onto a second sub-range of voltages. Depending on the weight on the scale, one or the other of the transformed voltages is applied to the ADC input terminal, and the digital output is scaled accordingly. The circuitry includes a range flag and logic circuitry for sensing the digital ADC output, and controlling the range flag. When the range flag is in a first state (signifying that the low weight sub-range is selected) and the ADC output signifies a weight above the low sub-range, the range flag is set to a second state (high weight sub-range). Similarly, when the range flag is in the second state and the ADC output signifies a weight below the high sub-range, the range flag is set to the first state.

5 Claims, 4 Drawing Figures

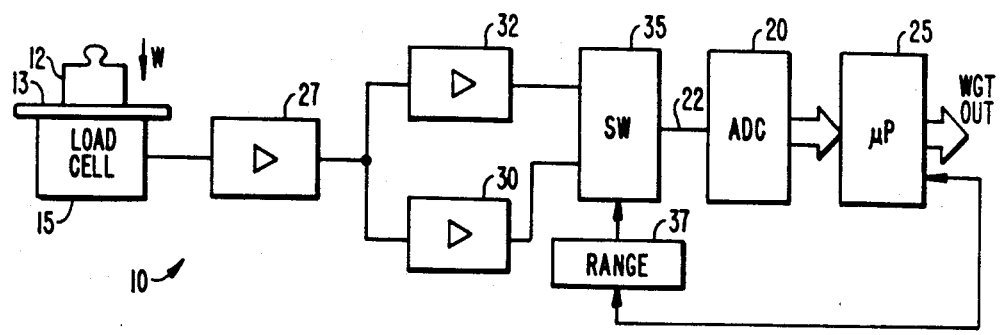
FIG._1.
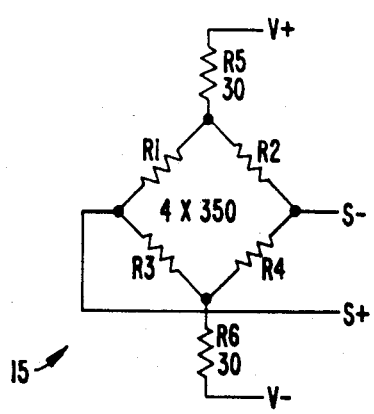
FIG._2A.
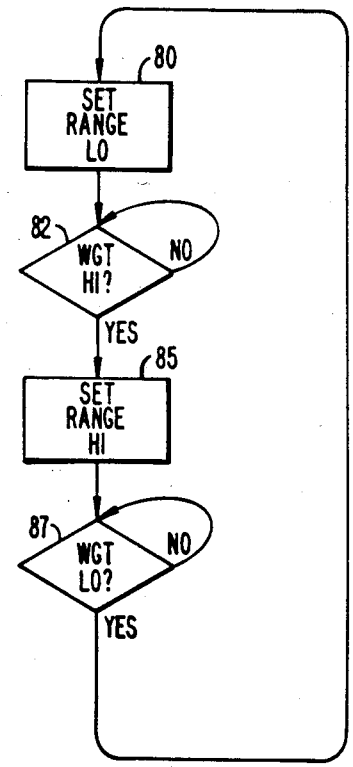
FIG._3.

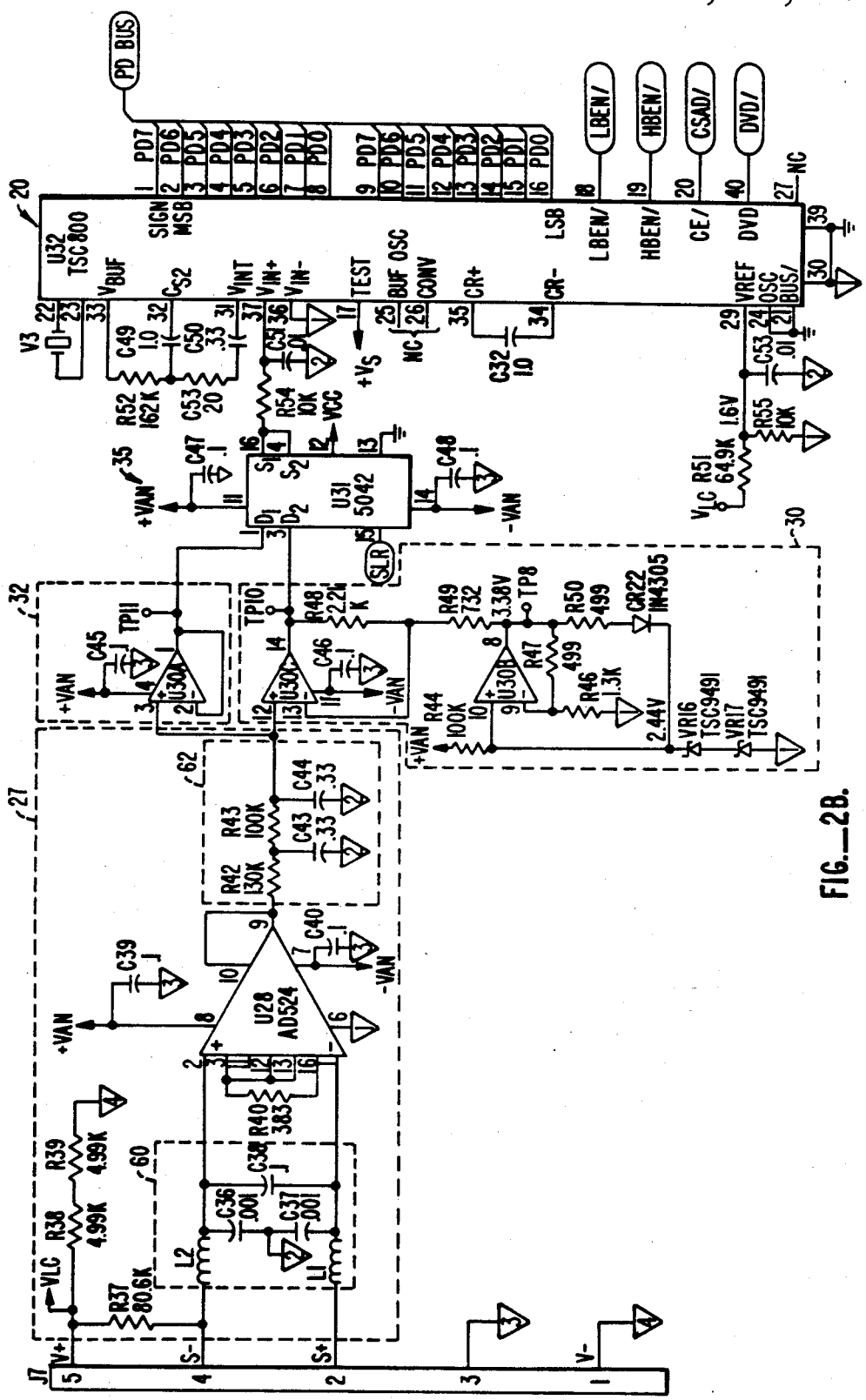
FIG._2B.

DUAL-RANGE ANALOG-TO-DIGITAL CONVERTOR

FIELD OF THE INVENTION

The present invention relates generally to electronic scales, and more specifically to improved circuitry for coupling the load cell to the ADC.

BACKGROUND OF THE INVENTION

A typical prior art electronic scale comprises a load cell, which provides an analog voltage representative of weight on the scale, an analog-to-digital convertor ("ADC") for converting the analog voltage to a digital form, and a microprocessor with associated interface circuitry for transforming the digital output from the ADC into appropriate units of weight. The system electronics typically includes amplification circuitry for transforming the raw voltage from the load cell into a suitable range for input to the ADC. One type of commercially available monolithic ADC provides a 16-bit digital output (15 bits plus sign bit) representative of an analog input voltage received at a set of input terminals. The permissible range of input voltages may be defined by an external reference, with ±2-4 volts being typical.

Clearly, a key factor in the performance of the scale is the ability of the ADC to provide a digital representation of the load cell voltage with sufficient resolution. Consider the example of a 100-pound scale where the ADC has a ±3.2-volt input range. Assuming the load cell voltage is appropriately offset and amplified to provide the full ±3.2-volt swing for the 0–100 pound range of weights, the ADC output will range over ±32K counts, providing approximately 41 counts per ounce. Unfortunately, the ADC output is not stable but is characterized by significant drift (perhaps tens of counts over a period of minutes). Although the drift is slow enough that it can be tracked and compensated, the weight is not accurate to a single count. Accordingly, the actual resolution of the scale is coarser than the 1/41-ounce theoretical maximum. Indeed, with tracking instabilities of one or two counts, conservative design would allow four counts (approximately 1/10 ounce) as the smallest weight subdivision. This is certainly acceptable for certain applications, but not others. Greater sensitivity, if needed, may be achieved by configuring the scale for a lower weight range (a 25-pound maximum would provide the 1/40-ounce resolution) or by using an ADC with more bits.

SUMMARY OF THE INVENTION

The present invention provides method and apparatus for the improved operation of an electronic computing scale in a manner that effectively overcomes the inherent limitations on resolution discussed above. The invention recognizes that high resolution is most important for low weights, and provides significantly increased resolution in a first weight sub-range (0–12 pounds in the illustrative embodiment). A coarser resolution is provided in a second weight sub-range (11–100 pounds). This is accomplished with a standard 16-bit ADC in a circuit that exhibits a high degree of noise immunity and stability.

In brief, the invention contemplates communicating the raw load cell voltage along first and second branches, subjecting it to a different transformation in each branch to produce first and second transformed voltages. In the first branch, raw voltages corresponding to weights in the low sub-range are mapped onto a desired sub-range of voltages. In the second branch, raw voltages corresponding to weights in the high sub-range are mapped onto a second sub-range of voltages.

Depending on the weight on the scale, one or the other of the transformed voltages is applied to the ADC input terminal, and the digital output is scaled accordingly. To this end, the circuitry includes a range flag and appropriate logic circuitry (typically associated with the microprocessor) for sensing the digital ADC output, and controlling the range flag. When the range flag is in a first state (signifying that the low weight sub-range is selected) and the ADC output signifies a weight above the low sub-range, the range flag is set to a second state (high weight sub-range). Similarly, when the range flag is in the second state and the ADC output signifies a weight below the high sub-range, the range flag is set to the first state. Depending on the state of the range flag, the corresponding transformed voltage is applied to the ADC input terminal.

In the preferred embodiment, the two transformed voltages span respective ranges that overlap and are both generally centered about 0 volts. Although there is no requirement that either or both of the ranges of voltages be centered at 0 volts, such a configuration provides better immunity to fluctuations, and tends to allow the digital output to be extracted more rapidly.

In order to provide greater sensitivity in the low weight sub-range, the raw voltage is amplified more (a factor of 4) in the first branch than in the second. Therefore, the first transformed voltage varies with weight more (by a factor of 4) than does the second transformed voltage.

A further understanding of the nature and advantages of the present invention may be realized by reference to the remaining portions of the specification and the attached drawings.

BRIEF DESCRIPTION OF THE DRAWINGS

FIG. 1 is a system block diagram of an electronic computing scale according to the present invention;

FIGS. 2A–B are circuit schematics of the scale circuitry; and

FIG. 3 is a flow chart showing the range-switching logic sequence.

DESCRIPTION OF THE PREFERRED EMBODIMENT

FIG. 1 is a system block diagram of the circuitry for an electronic computing scale 10, the basic function of which is to provide a numeric output corresponding to the weight of a load 12 present on a platform 13. The basic scale operation contemplates a load cell 15, mechanically coupled to platform 13, for providing an analog voltage representative of load weight. The voltage is communicated (with some amplification and offsetting as will be described below) to an analog-to-digital convertor ("ADC") 20. ADC 20 has an input terminal 22, and operates to provide a digital output signal corresponding to the analog voltage at input terminal 22. In the preferred embodiment, ADC 20 provides a 16-bit output (15 bits plus a sign bit) for input voltages in the range of −3.2 volts to +3.2 volts. The ADC output is communicated to a microprocessor 25 which converts it into appropriate units of weight. The present invention relates to the manner in which the raw voltage from load cell 15 is manipulated prior to being applied to ADC input terminal 22.

The basic operation of the invention is to communicate the raw load cell voltage along two branches, and subject the voltage to different offset and amplification in each branch. Specifically, the raw voltage from the load cell is communicated to an amplifier 27 (which provides a DC offset and filtering). The output is communicated in one branch to an amplifier 30 (which provides an additional DC offset) and in the other branch to an amplifier 32. This provides first and second transformed voltages, each of which is a linear representation of the raw voltage, but with its own characteristic offset and gain factors. The two transformed voltages are provided as selectable inputs at an analog switch 35, the single output of which is communicated to ADC input terminal 22. The state of switch 35 is controlled by a range flag 37 which, while shown as a separate register, may be within the microprocessor.

Both transformed voltages lie in suitable voltage sub-ranges for input to ADC 20. In the preferred embodiment the two voltage sub-ranges overlap and are centered about 0 volts. The first transformed voltage lies within the first sub-range for weights in a low sub-range while the second transformed voltage lies within the second sub-range for weights in a high sub-range.

The first transformed voltage is characterized by a variation as a function of weight (defined by the net gain of amplifiers 27 and 30) that is greater (by a factor of 4) than the variation as a function of weight of the second transformed voltage (defined by the net gain of amplifiers 27 and 32). In the specific embodiment to be described more fully below, the first transformed voltage varies between +1.23 volts and −1.23 volts for weights in the sub-range 0–12 pounds, while the second transformed voltage ranges from +2.28 volts to −2.28 volts for weights in the sub-range 11–100 pounds.

For reasons to be discussed below, the offset and gain for the second transformed voltage are chosen so that the second transformed voltage remains in the permissible range of ADC inputs even for weights in the low sub-range.

FIG. 2A is a circuit schematic of load cell 15. Load cell 15 comprises four nominally equal resistors R1–R4 configured as a bridge with two of the opposite corners defining a pair of output terminals S+ and S−. The other two opposite corners are connected through respective temperature-compensating resistors R5 and R6 to a pair of excitation terminals V+ and V−. A DC voltage is applied to terminals V+ and V−, and the raw load cell voltage appears between terminals S+ and S−. Resistors R1–R4 are nominally equal but are arranged so that resistors R1 and R4 are subjected to the load, thereby causing their resistance to change as a function of load weight. With zero weight on platform 13, and assuming no external current paths between the excitation terminals and the output terminals, the voltage between output terminals S+ and S− would be 0 volts. When weight is put on the platform, the stressed resistors change resistance relative to the unstressed ones, causing the bridge to become unbalanced. For the specific 100-pound capacity load cell in the preferred embodiment, the raw load cell voltage is nominally 2 mv per volt of excitation at maximum load. For terminal V+ at +12 volts and terminal V− at ground, this is 0.24 mv/pound.

FIG. 2B is a circuit schematic of the remaining portions of the circuitry for converting the raw load cell voltage into a digital form.

A pull-up resistor R37 (shown as part of amplifier 27) is connected between the V+ (12-volt) terminal and the S− terminal of the load cell, and causes the voltage between terminals S+ and S− to be non-zero for zero weight. For the specific values shown, the offset is −13.32 mv so that the voltage varies from −13.32 mv to +10.68 mv (rather than from 0–24 mv) for weights in the range of 0–100 pounds. Amplifier 27 includes an instrumentational amplifier U28 having low pass filters 60 and 62 at its input and output terminals, respectively. Amplifier U28 is configured to provide a gain of −213, so that the output voltage varies from +2.79 volts at 0 pounds to −2.28 volts at 100 pounds (and is +2.28 volts at 11 pounds). As previously noted this voltage is communicated along separate circuit branches to amplifiers 32 and 30.

Amplifier 30 provides gain and an additional offset. More particularly, an operational amplifier ("op amp") U30C is configured to provide a gain of 4.0 (as defined by voltage divider resistors R48 and R49) and an offset of −10.14 volts. The offset is provided by an op amp U30B configured to provide a stable DC reference of 3.38 volts (defined by resistors R46 and R47 and Zener diodes VR16 and VR17). This reference voltage is applied to voltage divider resistors R48, R49 in the feedback loop of op amp U30C. The result is that the output voltage from op amp U30C ranges +1.23 volts at 0 pounds to −1.23 volts at 12 pounds. This is the first transformed voltage.

Amplifier 32 comprises an operational amplifier ("op amp") U30A configured as a voltage follower to provide unit gain. Thus the output voltage varies from 2.79 volts at 0 pounds (and +2.28 volts at 11 pounds) to −2.28 volts at 100 pounds. This is the second transformed voltage.

ADC 20 is provided with a 1.6-volt reference voltage so that it provides full output (7FFF (hex)) for an input voltage of +3.2 volts (and −7FFF for −3.2 volts). This ADC reference voltage is derived from the load cell excitation voltage to prevent fluctuations in the excitation voltage from causing changes in the digital output.

During operation, the microprocessor periodically samples the output signal from ADC 20 and converts the digital code into weight, utilizing a previously stored value (the "zero value") corresponding to the ADC output for zero weight and a predetermined slope factor (which is applied to the difference between the actual ADC output and the zero value). The microprocessor stores both these parameters for each of the two weight sub-ranges.

The main functions to be discussed at this point are compensating for drift, computing weight, and switching range to optimize the weight information. The first two of these functions are not specifically part of the present invention and will only be described in general terms and to the extent they affect or are affected by the range determination.

FIG. 3 is a flow chart illustrating the manner in which range flag 37 (and hence switch 35) is controlled by microprocessor 25 in order to select the appropriate transformed voltage for input to the ADC. The discussion at this point will ignore the effects of drift. Initially, range flag 37 is set low (at 80), and the output of ADC 20 tested (at 82). If the ADC output signifies a weight above the low sub-range, range flag flag 37 is set high (at 85). The ADC output is tested (at 87), and if it signifies a weight below the high sub-range, the range flag is set low (at 80). The high and low weight sub-ranges are selected with an overlap to prevent a situation where a weight on the boundary between sub-ranges causes the range flag to continually shift back and forth.

The following discussion will take drift into account. As noted above, the digital output from ADC 20 is not a stable quantity, but rather is characterized by drifts on the order of one or at most a few counts per second. These drifts are due mainly to the effects of temperature variations, and are easily distinguished from changes in the weight on the scale. The microprocessor compares successive counts from the ADC, and changes less than a particular threshold amount are assumed to arise from thermal drift. In such cases, the microprocessor updates the zero value so that the computed weight remains the same.

Consider an initial state with zero weight on the scale. The scale is provided with a reset button (not shown in the figures), and to the extent that the display does not show zero weight, the operator presses the reset button to specify that there is no weight on the scale. At this point, the microprocessor stores the ADC output as the zero value. As the output drifts, the stored zero value is updated accordingly. The microprocessor samples the ADC with the range flag low and and also with it high (the latter less frequently) so that the zero values for both sub-ranges can be determined.

When weight is added to the scale, if the digital output signifies a weight above 12 pounds, the range flag is set high as described above. Once this happens, the weight can immediately be displayed properly since the zero value for the high sub-range has been periodically updated (albeit not as often as the zero value for the low sub-range).

Consider next a state when a weight in the high sub-range is initially on the scale and part of the weight is removed, bringing the total weight on the scale to the low sub-range. At this point, only the zero value for the high sub-range has been tracked, so the weight that is calculated is on the basis of the second transformed voltage (the output from amplifier 32). When it is determined that this weight falls in the low sub-range (below 11 pounds), the range flag is set low, a new zero value for the low sub-range is calculated, and further drifts are compensated on the basis of the output from amplifier 30.

For the particular numerical values discussed above, it can be seen that the ADC provides about 132 counts/ounce when supplied with the first transformed voltage and about 33 counts/ounce when supplied with the second transformed voltage. This is sufficient to provide a precision of 1/32 ounce in the low sub-range and 1/10 ounce in the high sub-range, assuming that the drifts can be adequately absorbed with 4 counts in the low sub-range and 3 counts in the high sub-range (which is conservative).

In conclusion, it can be seen that the present invention effectively maximizes the useful weight information that can be extracted from the scale. Weights in the low sub-range of a few pounds, where greater precision is necessary, are measured to the required precision while weights in the high sub-range, where the precision requirements tend to be more relaxed, are still measured to a fraction of an ounce.

While the above is a complete disclosure of the preferred embodiment of the invention, various modifications, alternative constructions, and equivalents may be used. For example, while the offsets for the transformed voltages are shown as being established by the pull-up resistor (R37) at the load cell and the fixed reference voltage in amplifier 30, the pull-up resistor could have been eliminated, and different offsets introduced in amplifier 30 and 32. Additionally, while the offsets result in the two voltage sub-ranges being centered at 0, this is not absolutely necessary. Indeed, the voltages for the low weight sub-range only span approximately 2.4 volts, and could have been located anywhere in the $-3.2$ to $+3.2$ range of the ADC. Therefore, the above description and illustrations should not be taken as limiting the scope of the present invention which is defined by the appended claims.

I claim:

1. An electronic computing scale comprising:

load cell means for providing a raw analog voltage representative of weight bearing on said load cell means;

analog-to-digital convertor ("ADC") means, having an ADC input terminal adapted to receive an analog input voltage, for providing a digital ADC output signal representative of the input voltage at said ADC input terminal, said ADC means operating to provide unique digital output signals for input voltages lying within a predetermined permissible range;

first transform means, responsive to the raw voltage, for providing a first transformed voltage lying within a first voltage sub-range contained within said permissible range when the weight is in a low sub-range;

second transform means, responsive to the raw voltage, for providing a second transformed voltage lying within a second voltage sub-range contained within said permissible range when the weight is in a high sub-range;

said first and second transformed voltages being characterized by respective first and second variations as a function of weight, the first characteristic variation exceeding the second characteristic variation;

a range flag having at least first and second states;

switch means, responsive to the state of said range flag, for applying said first transformed voltage to said ADC input terminal when said range flag is in its first state and said second transformed voltage to said ADC input terminal when said range flag is in its second state; and logic means, responsive to said ADC output signal and to the state of said range flag, for controlling said range flag so that if said range flag is in its first state and said ADC output signal corresponds to an input voltage outside said first voltage sub-range, said range flag is set to its second state, and if said range flag is in its second state and said ADC output signal corresponds to an input voltage outside said second voltage sub-range, said range flag is set to its first state.

2. The scale of claim 1 wherein the upper end of said low sub-range of weights exceeds the lower end of said high sub-range of weights.

3. The scale of claim 1 wherein said first voltage sub-range is generally centered at zero volts.

4. The scale of claim 1 wherein said second voltage sub-range is generally centered at zero volts.

5. The scale of claim 1 wherein said first and second voltage sub-ranges are generally centered at zero volts.

* * * * *